United States Patent [19]

Kraft

[11] Patent Number: 4,648,782
[45] Date of Patent: Mar. 10, 1987

[54] UNDERWATER MANIPULATOR SYSTEM

[76] Inventor: Brett W. Kraft, 7300 Springfield, Prairie Village, Kans. 66208

[21] Appl. No.: 498,878

[22] Filed: May 27, 1983

[51] Int. Cl.$^4$ .............................................. B25J 13/00
[52] U.S. Cl. .................... 414/735; 901/22; 901/25; 901/28; 901/29
[58] Field of Search ...................... 414/1, 2, 4, 5, 730, 414/735, 917; 901/15, 22–26, 28, 29, 36–38

[56] References Cited

U.S. PATENT DOCUMENTS

| | | | |
|---|---|---|---|
| Re. 26,904 | 6/1970 | Lemelson | 414/730 |
| 2,846,084 | 8/1958 | Goertz et al. | 414/5 |
| 2,934,033 | 4/1960 | Dent et al. | 114/51 |
| 3,165,899 | 1/1965 | Slatto | 61/69 |
| 3,381,485 | 5/1968 | Croaks et al. | 61/69 |
| 3,400,541 | 9/1968 | Lloyd et al. | 414/5 X |
| 3,418,818 | 12/1968 | Vincent et al. | 61/69 |
| 3,451,224 | 6/1969 | Colechia et al. | 61/69 |
| 3,463,226 | 8/1969 | Johnson | 166/0.5 |
| 3,550,386 | 12/1970 | Ballinger | 61/69 |
| 3,708,990 | 1/1973 | Crooke | 61/69 |
| 3,717,000 | 2/1973 | Rothwell, Jr. | 29/213 X |
| 3,759,563 | 9/1973 | Iamura | 294/88 |
| 3,890,552 | 6/1975 | Devol et al. | 318/568 |
| 4,010,619 | 3/1977 | Hightower et al. | 61/69 |
| 4,068,156 | 1/1978 | Johnson | 901/29 X |
| 4,196,049 | 4/1980 | Burns et al. | 176/19 R |
| 4,216,701 | 8/1980 | Komoriya | 901/37 |
| 4,378,959 | 4/1983 | Susnjara | 414/735 X |
| 4,496,279 | 1/1985 | Langer | 901/29 X |

FOREIGN PATENT DOCUMENTS 226849   9/1962   Austria ...................................... 414/4

Primary Examiner—Robert J. Spar
Assistant Examiner—Donald W. Underwood
Attorney, Agent, or Firm—Litman, Day, & McMahon

[57] ABSTRACT

A manipulator device particularly adapted for deep-sea, submersible use utilizes a human-like arm and a novel shoulder arrangement mounted on a base through a base pivot. The manipulator is hydraulically powered and a hydraulic manifold forms a body of the shoulder arrangement and is situated adjacent an azimuth control actuator, an elbow control actuator and an upper arm control actuator all mounted to the body and rotatable with the body about the base pivot. The arm includes an upper arm swingably connected to the shoulder via the upper arm control actuator and a forearm swingably connected to the upper arm at an elbow joint and controlled by the elbow control actuator. A wrist assembly and appropriate actuators are mounted to a distal end of the forearm and a gripper assembly and associated actuators are connected to a distal end of the wrist assembly.

6 Claims, 35 Drawing Figures

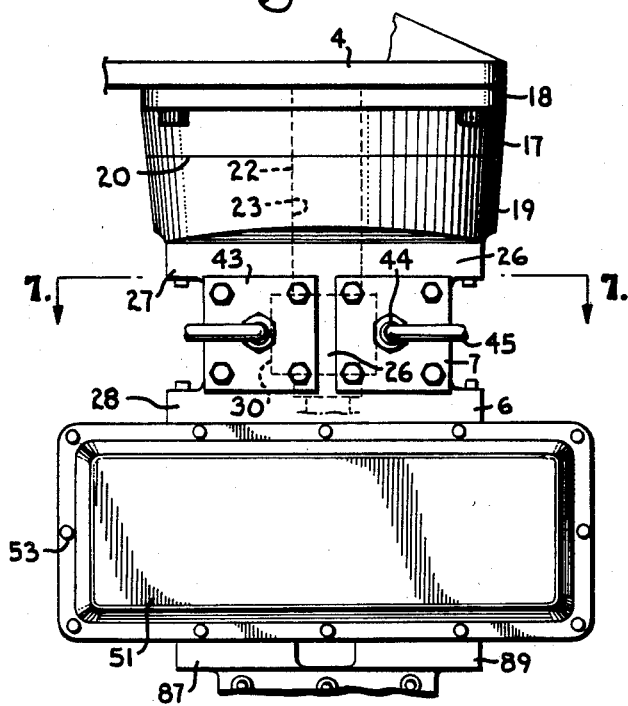
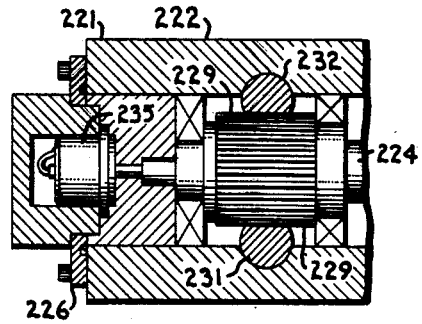
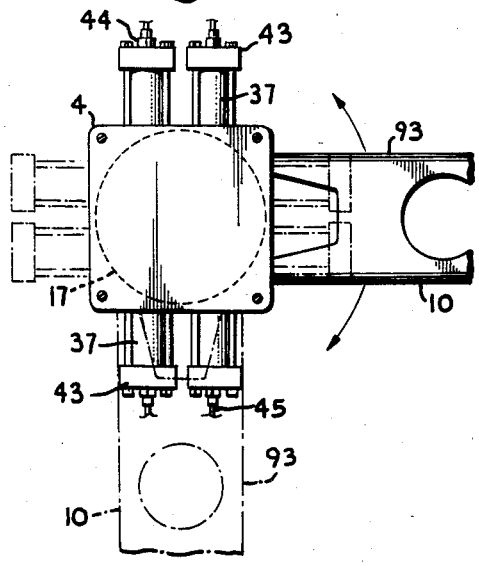
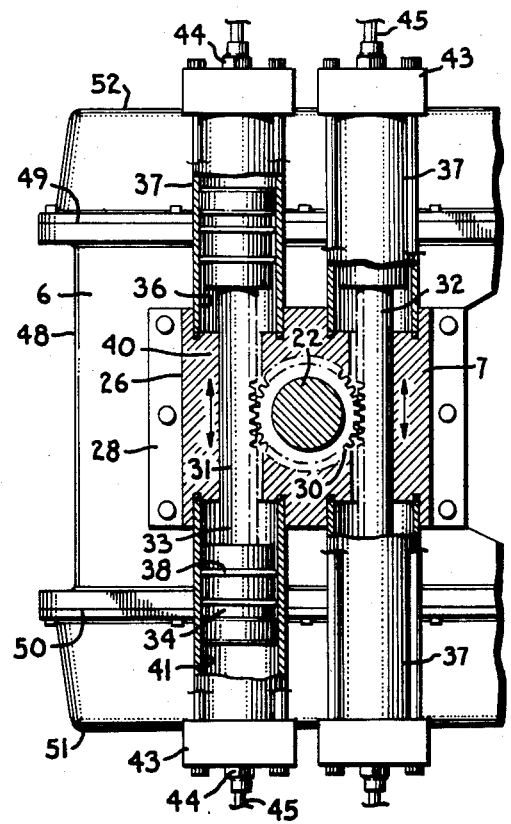

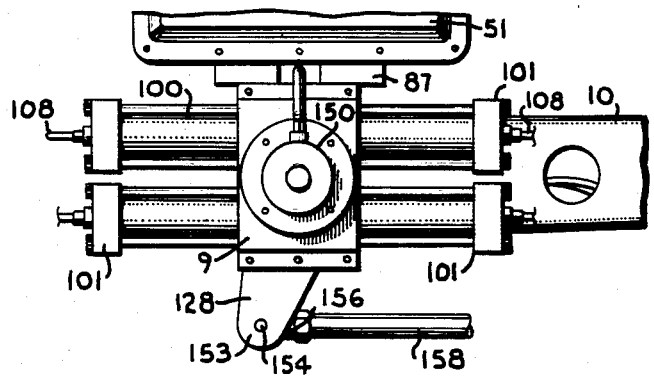
Fig. 16.
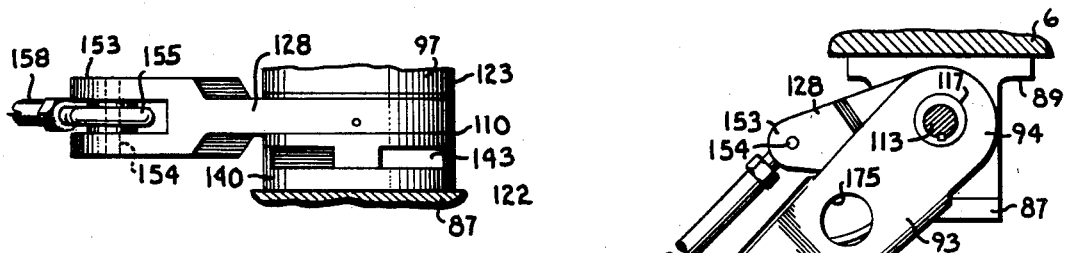
Fig. 17.
Fig. 18.
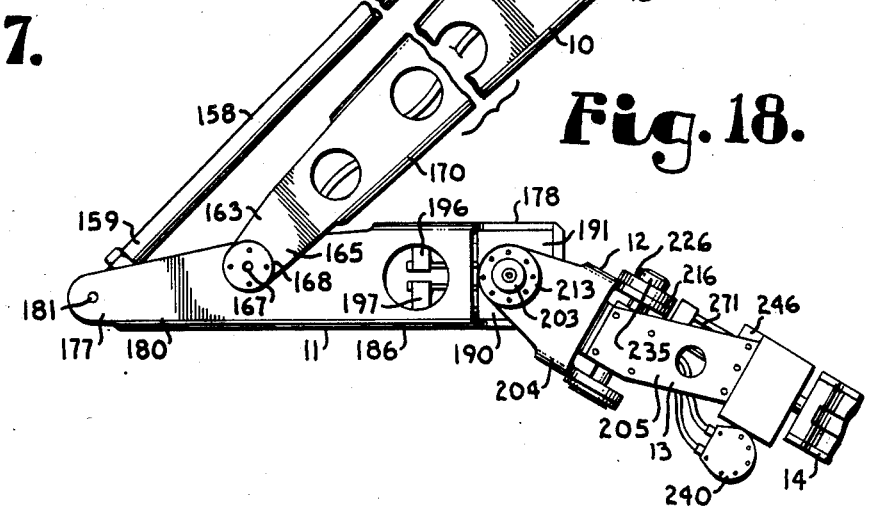
Fig. 19.
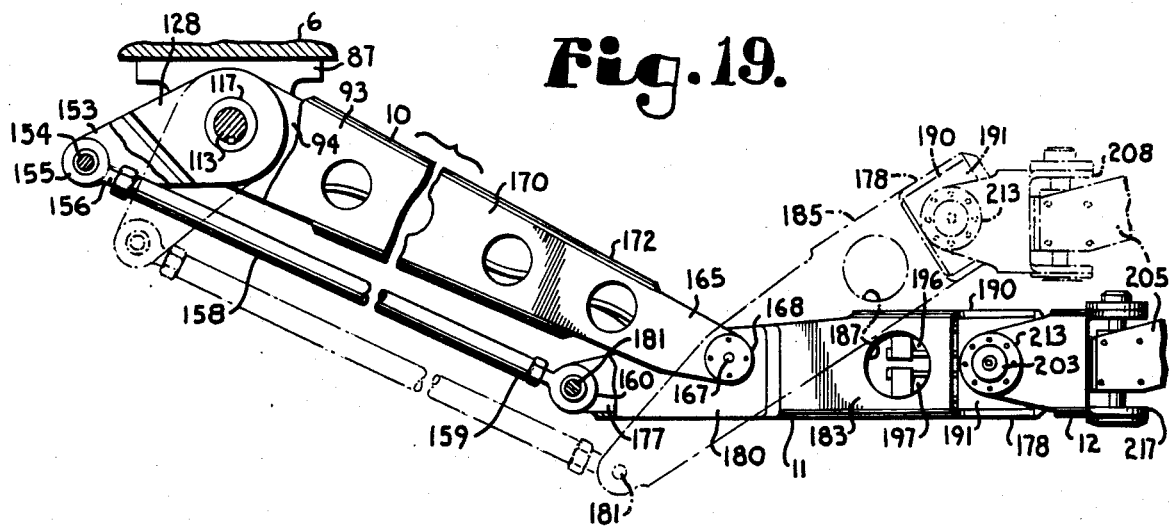

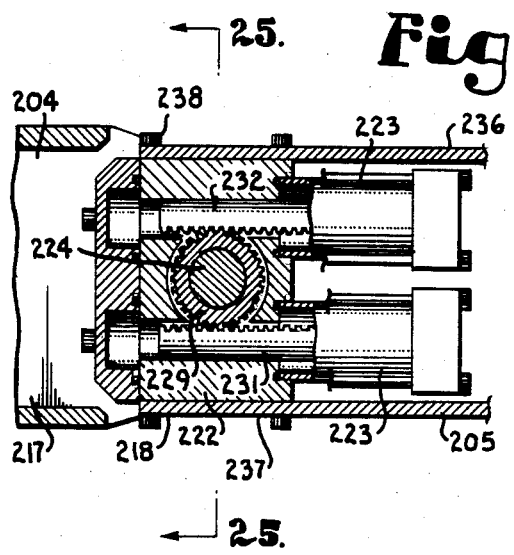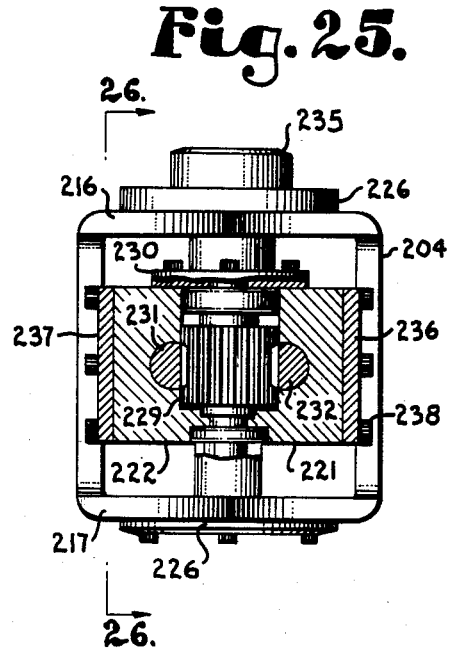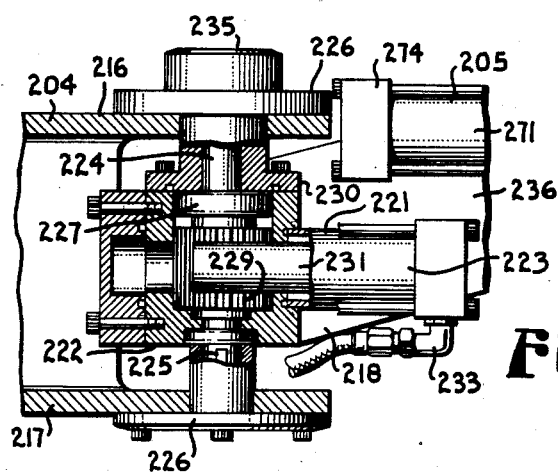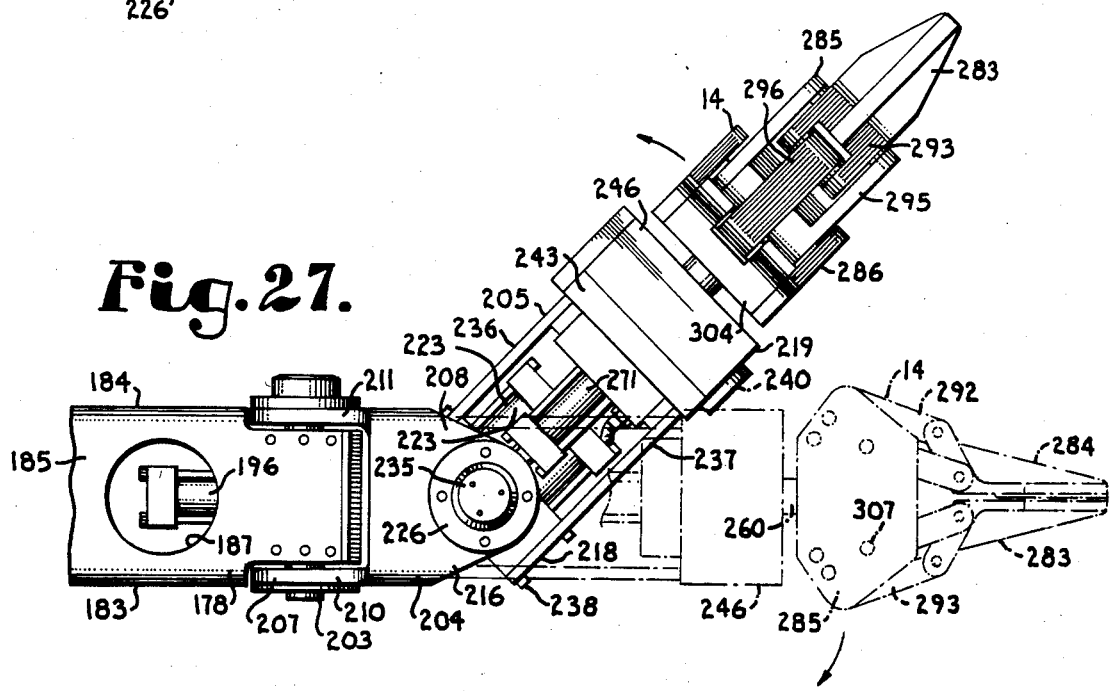

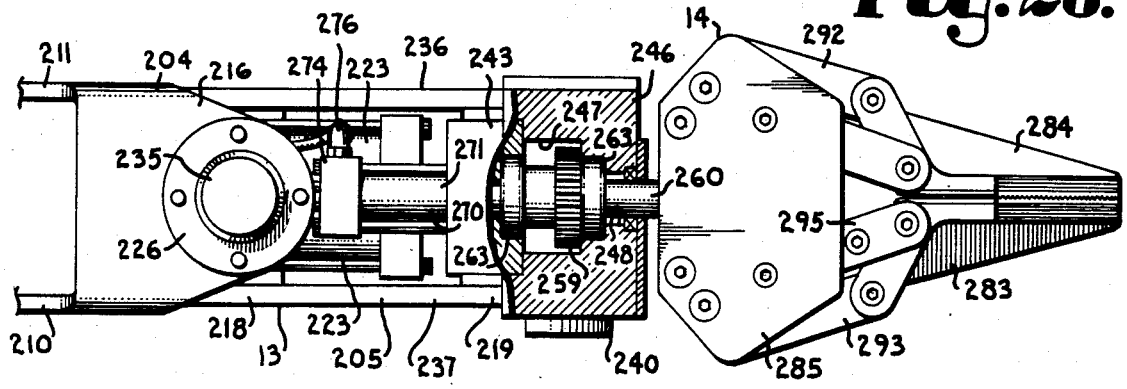
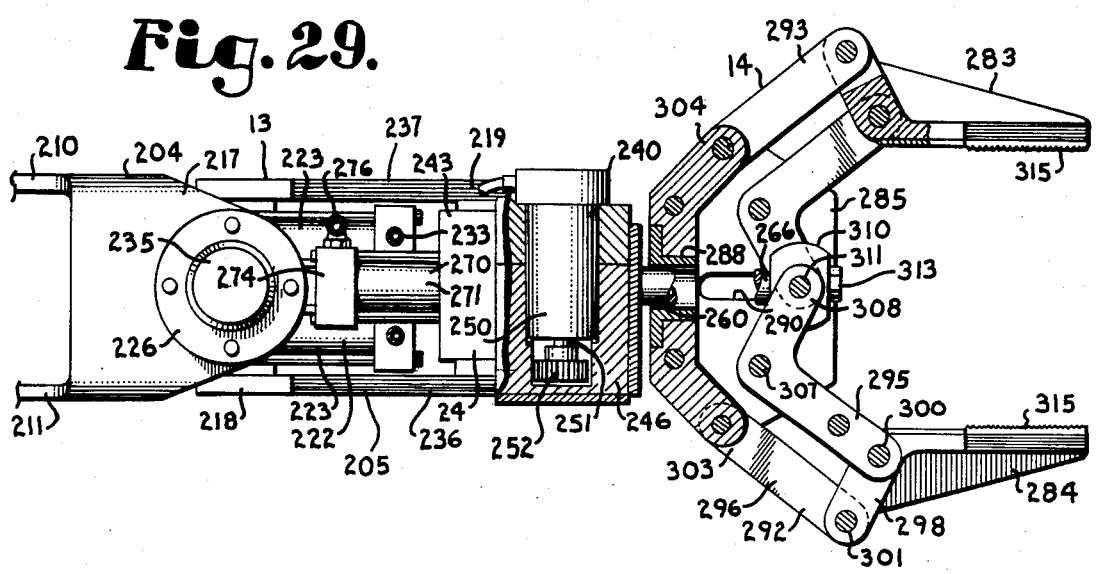
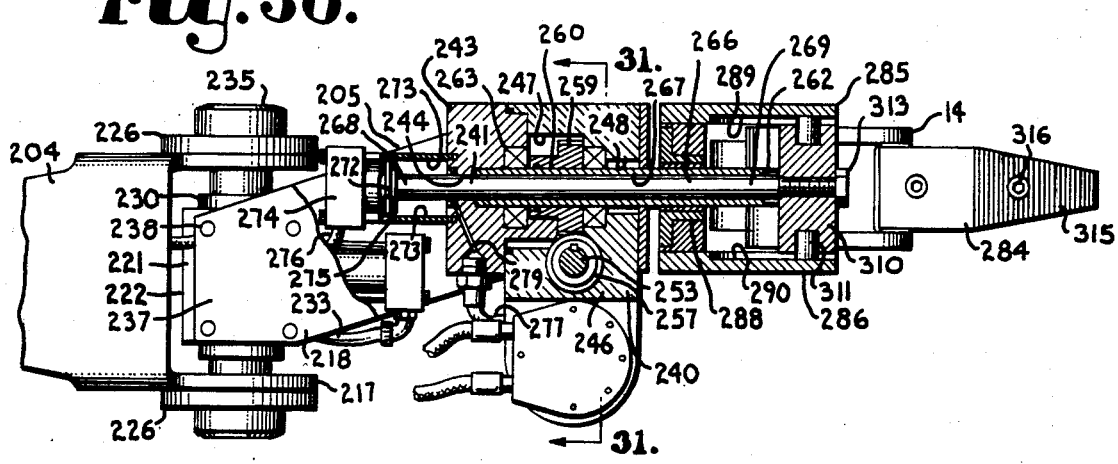

UNDERWATER MANIPULATOR SYSTEM

This invention relates to robotic devices and in particular to manipulators used in submersible or undersea work.

BACKGROUND OF THE INVENTION

Many developments in robotics have taken place within recent years to broaden the range of tasks capable of action by robots. One problem has stemmed from the fact that many robots are not truly lifelike or anthropomorphic in design and accordingly, an operator is limited to the types of tasks for which a robot can be used. A primary use for robotic devices is in the deep sea environment wherein dangerous currents, cold water and extreme depth make human diving dangerous at best and in many cases impossible. For example, robots are needed for sea floor mining, recovery of lost or damaged objects and for work in the undersea structure of giant drill rigs and associated well heads. The combined effects of salt water corrosion and extreme pressure provide a hostile working environment to ordinary robotic devices.

The instant robotic device is an assembly consisting of a human or computer operated controller, a linking electrical network, and a manipulator or robot designed to effectively and smoothly carry out the commands of the controller. The present invention comprises such a manipulator and is designed to operate at unlimited depths wherein the controller and the human or computer operator may be situated at the surface, the network electrical linkage extends from the surface to the manipulator and the manipulator is positioned on the sea floor and mounted on a vehicle for movement to the work site. Various types of vehicles can be used and range from simple platforms positionable by cables or the like to complex submarine vehicles capable of operating at great depth. In the latter, the human operator and controller device may be situated in the submarine and the manipulator mounted to the outside surface and responsive to commands of the controller. The instant device is relatively lightweight, precise in movement, and designed for easy adaptation to remotely operated vehicles, yet built with a ruggedness required to withstand the rigorous offshore environment.

The manipulator forms part of a system comprising a two-station electro-hydraulic device consisting of a "master" controller and a remotely positioned "slave" manipulator. movements introduced at the master controller by the operator are duplicated by the slave manipulator and produce a spatial correspondence between the master and slave. The master/slave concept and the anthropomorphic design of the manipulator provide an instinctive feel for the controls, allowing an inexperienced operator to perform tasks with human-like motion and speed. The disclosed device is capable of six types of freedom of motion plus a variable force grip and provides true manipulative capability with a high degree of dexterity.

The manipulator is able to perform detailed tasks at depths inaccessible to divers and makes possible those tasks which were once economically or technologically unfeasible. The device can be used for inspection, maintenance, repair, salvage, construction and non-destructive testing.

BREIF DESCRIPTION OF THE DRAWINGS

FIG. 5 is an enlarged fragmentary side elevational view of the connection of a shoulder arrangement to a base.

FIG. 6 is a fragmentary enlarged sectional view taken along lines 6—6, FIG. 4, and reversed in orientation.

FIG. 7 is a fragmentary sectional view taken along lines 7—7, FIG. 5.

FIG. 8 is a schematic plan view showing movement of the shoulder arrangement.

FIG. 16 is a reduced scale, fragmentary side elevational view of the shoulder arrangement showing the relationship of parts.

FIG. 17 is an enlarged, fragmentary plan view of a detail of the shoulder arrangement and showing an arm pivot and linkage rod.

FIG. 18 is a fragmentary side elevational view of the shoulder arrangement and showing elbow and wrist pivot mechanisms.

FIG. 19 is a fragmentary side elevational view of the arrangement as shown in FIG. 18 and depicting a second operative motive position.

FIG. 24 is a fragmentary sectional view taken along lines 24—24, FIG. 22.

FIG. 25 is a sectional view taken along lines 25—25, FIG. 24.

FIG. 26 is a fragmentary transverse sectional view taken along lines 26—26, FIG. 25.

FIG. 27 is a fragmentary plan view of a wrist assembly and gripper assembly showing yaw movement of the wrist and showing the gripper assembly in a second motive position.

FIG. 28 is a fragmentary, enlarged, plan view of the gripper assembly and actuator means.

FIG. 29 is a fragmentary plan view of the arrangement of FIG. 28 and showing opening of the gripper jaws.

FIG. 30 is a fragmentary side elevational view of the gripper assembly.

DESCRIPTION OF THE PREFERRED EMBODIMENTS

Figure 1:
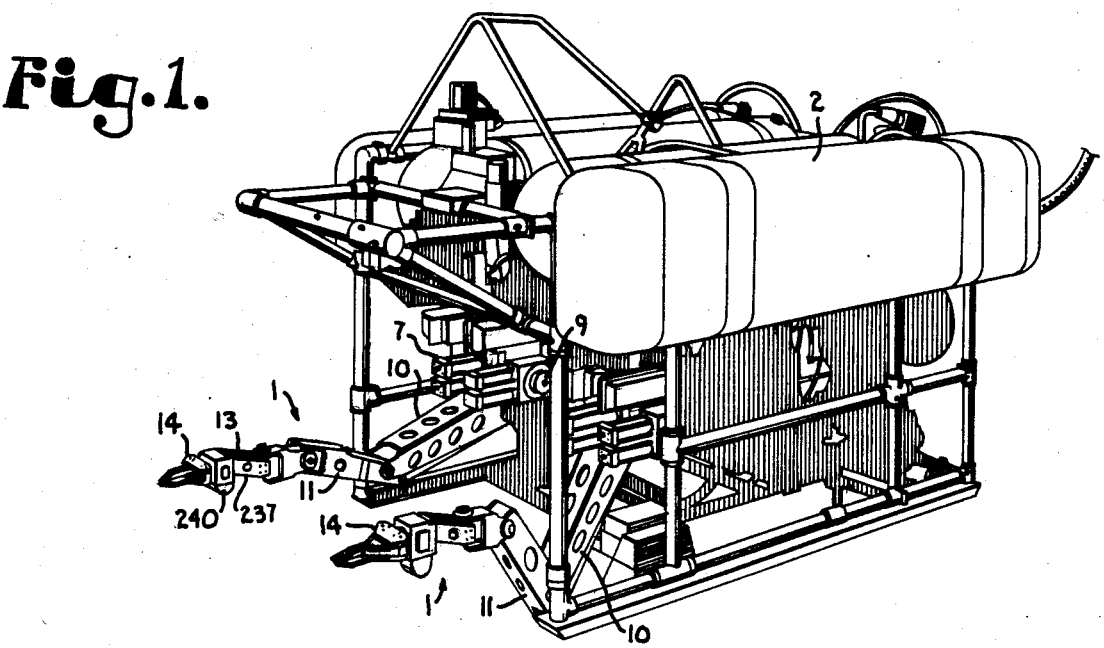
FIG. 1 is a perspective view of the submersible vehicle on which a manipulator device embodying the present invention is mounted.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIG. 1, generally indicates a manipulator device embodying the present invention. As depicted in FIG. 1, the manipulator device 1 may be mounted upon an underwater vehicle and may be positioned to extend upwardly, downwardly, sidewardly or any direction with reference to gravity. One or more manipulator devices 1 may be mounted upon the vehicle. An exemplary vehicle 2 is shown in FIG. 1 which is particularly adapted for undersea work although the manipulator device has application for work on the earth surface or even for work outside of the earth's atmosphere.

Figure 2:
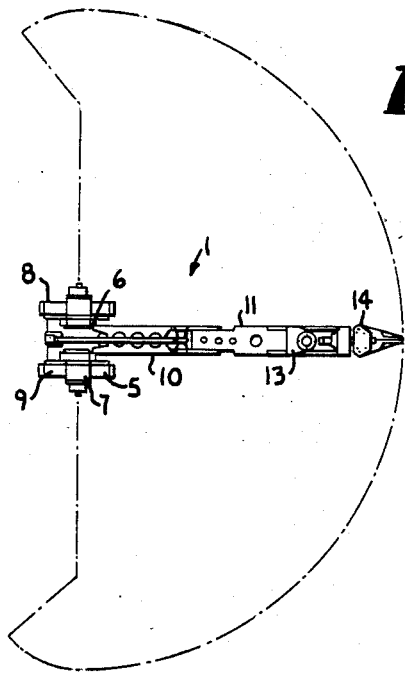
FIG. 2 is a top plan view taken along lines 2—2, FIG. 1 showing an azimuth performance envelope of the manipulator device.
Figure 3:
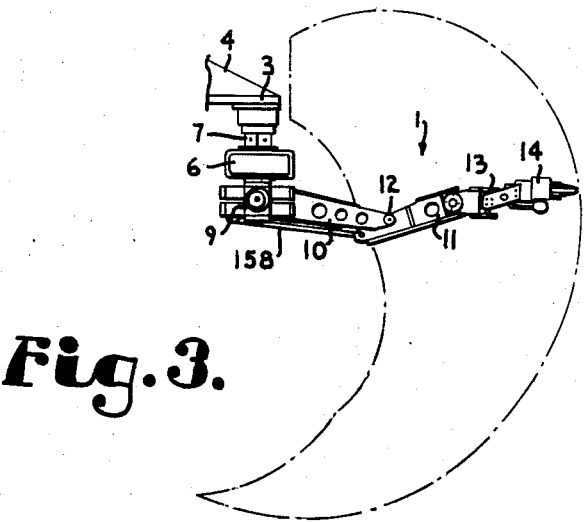
FIG. 3 is a fragmentary side elevational view showing a vertical performance envelope of the manipulator device.

Referring to FIGS. 2 and 3, the manipulator device 1 generally includes a base 3 for connection to a manipulator support 4 which is in turn connected to the vehicle 2, FIG. 1. A shoulder arrangement 5 is connected to the base 3 by an internal base pivot. The shoulder arrangement 5 includes a hydraulic power manifold 6 forming a body of the shoulder arrangement 5, an azimuth control means and actuator 7, an elbow means and actuator 8, and an upper arm control means and actuator 9, all mounted to the body and rotatable therewith about the base pivot. An upper arm member 10 is swingably connected to the shoulder arrangement 5 and is operably joined to the upper arm control means and actuator 9. A forearm member 11 is swingably connected to the upper arm member 10 at an elbow joint 12 and is operably connected to the elbow control means and actuator 8. A wrist assembly 13 and associated actuators are mounted to a distal end of the forearm member 11 and a gripper assembly 14 for manipulation is mounted to a distal end of the wrist assembly 13.

The manipulator device 1 is electromechanically actuated by an electrical control line extending from a controller unit (not shown) and connected to servo operated valves in the manipulator device 1 to route hydraulic fluid to cause operation of the various actuators, all of which are, in the illustrated example, hydraulically operated. Hydraulic fluid under pressure is routed from a remote pump and reservoir (not shown) through an umbilical cable (not shown) combined with the main electrical control line to the manipulator device. Preferably, and as described in further detail below, virtually all of the electrical and hydraulic lines are routed internally of the manipulator device 1 after reaching the device 1 so that there are no lines which may float or toss about and become entangled with other equipment.

The manipulator device 1 is capable of a substantial range of operation. The extent of range of travel in azimuth of an exemplary device 1 is shown in FIG. 2 and indicates over 180 degrees in azimuth. FIG. 3 shows the elevational range of the manipulator device 1 and indicates that over 180 degrees of elevation are available.

Figure 33:
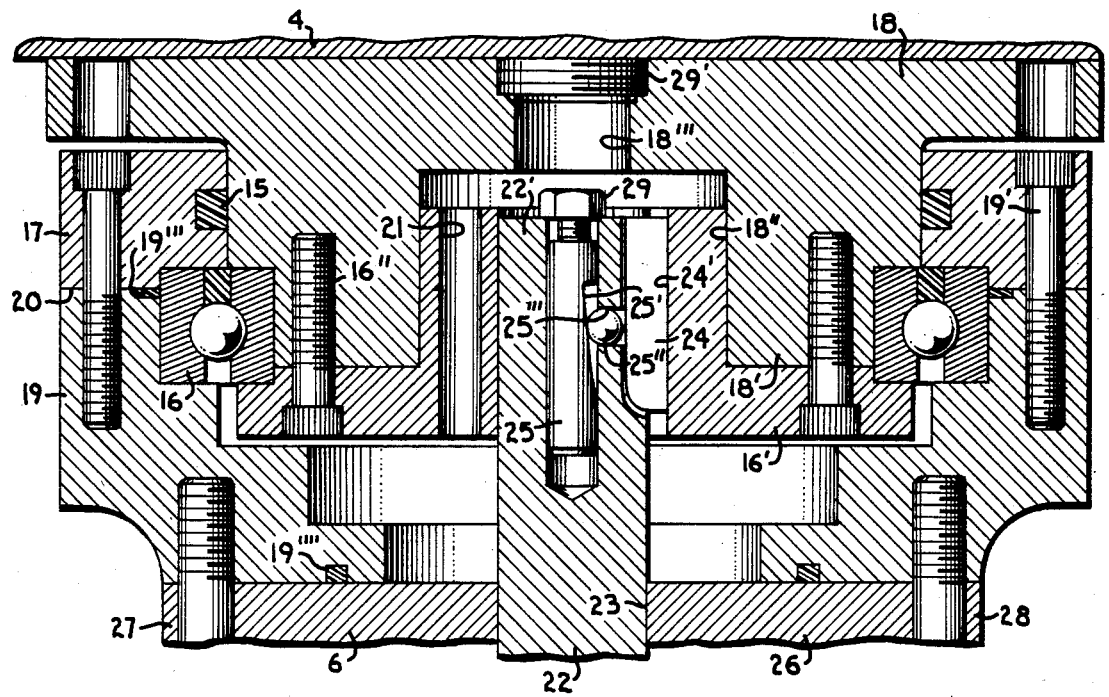
FIG. 33 is a fragmentary, enlarged view of the connection of the upper shoulder arrangement to a base.

In the illustrated example, FIGS. 4, 5, 7 and 8, a turret assembly extends between the base 3 and the shoulder arrangement 5 and includes a first mounted turret portion 17 relatively rotatable to a plate member 18 secured to the base 4 and a second mounted turret portion 19 secured to the turret portion 17 and the hydraulic power manifold 6. The plate member 18, FIG. 33, has an annular flange 18' surrounding a well 18" and a bore 18"' communicates with the well 18". The first mounted turret portion 17 comprises a ring having an inside diameter dynamic seal 15 seated in a groove and situated between the first mounted turret portion 17 and the annular flange 18' of the plate member 18. A sturdy bearing 16, such as of the ball and race type, is suitably mounted in seats between the annular flange 18' and the first mounted turret portion 17. A cup insert 16' is situated atop the annular flange 18' and also seats against one surface of the bearing 16 to securely mount the bearing 16 to the plate member 18. The cup insert 16' is affixed to the annular flange as by bolts 16" and includes a bore 21 extending longitudinally through the cup insert 16' for internal passage of hydraulic fluid to maintain a positive internal system pressure.

The second turret portion 19 is secured, as by bolts 19', to the first turret portion 17 and also includes a seat area for engagement with the bearing 16. Once secured together and about the bearing 16, the first and second turret 17 and 19 are rotatably mounted relative to the plate member 18 and rotate smoothly, thereon regardless of orientation. A static seal 19"" seals between the second turret portion 19 and the actuator body 26. The base pivot shaft 22 extends through the bore 23 in the turret portions 17 and 19 and has an upper end 22' nonrotatably affixed to the first turret portion 17, by a key 24 received within a keyway 24' in the well 18" of the cup insert 16'.

Figure 34:
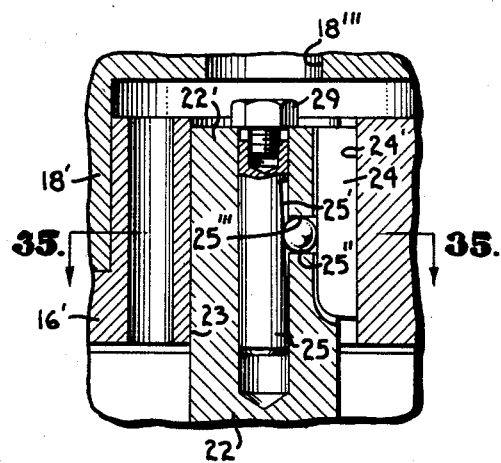
FIG. 34 is an enlarged, fragmentary detail view of a pin and key structure in the upper shoulder arrangement.
Figure 35:
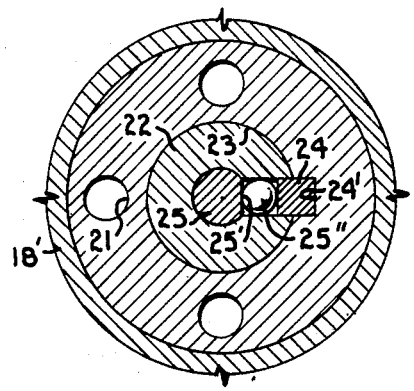
FIG. 35 is a cross-sectional view taken along lines 35—35, FIG. 34.

To extend or retract the key 24 from or into the pivot shaft 22, the shaft 22 has an axial bore in which a pin 25 is received. The pin 25 has a ramp or inclined surface 25' against which a ball 25" seats and is urged radially through a transverse passage 25"'. For extension, the ball 25" bears against the key 24 and urges it into the keyway 24' as the pin 25 moves upwardly, in the orientation shown in FIGS. 33 and 34. To provide longitudinal movement of the ball 25", a bolt 29 is received at the upper end of the pin 25 and bears against the upper end of the base pivot shaft 22. The bore 18'" provides access to the bolt 29 and is closed by a plug 29'.

The azimuth control means and actuator 7 is secured to the second turret portion 19 and in the illustrated example, has a body 26 with all parts appropriately sealed against leakage and with spaced mounted flanges 27 and 28 secured as by bolts respectively to the second turret portion 19 and the hydraulic power manifold 6. The base pivot shaft 22 extends into the actuator body 26 and a pinion 30, FIG. 7, is secured to the lower end of the pivot shaft 22.

The pinion 30 and pivot shaft 22 form a part of the azimuth control means and actuator 7. On opposite sides of the pinion 30 are gear racks 31 and 32, each with a plurality of teeth engaging the teeth of the pinion 30. The toothed gear racks 31 and 32 each have opposite ends 33, FIG. 7, with pistons 34 mounted on the ends 33 and received within the respective bores 36 of cylinder 37. The pistons 34 each carry a plurality of annular glands or seals 38, such as in the form of O-rings, to retain a pressure differential between different operative sides of the pistons 34. The azimuth control actuator 7 includes a body interior portion 40 and a plurality of cylinder chambers 41 into which the fluid is ported to act upon the pistons 34 and cause movement, as is well known to one skilled in the art to cause the gear racks 31 and 32 to move in the desired directions, such as indicated by the arrows, FIG. 7. Ends of the cylinders 37 are closed by end plates 43 which have ports 44 extending therethrough and into the chambers 41, and connected by conduits 45 to the appropriate hydraulic valving arrangement.

A slight positive pressure differential is maintained within the body interior portion 40 by hydraulic fluid ported thereinto. At normal sea level atmospheric pressure, the positive pressure within the body interior portion 40 is about 5 to 10 psi greater than ambient pressure and the relationship is maintained at such differential in proportion to decreasing and increasing ambient pressure on the manipulator device as by submersion at great depth or elevation to a high altitude. This slight positive pressure over ambient pressure ensures against entry of foreign substances into the body interior portion 40, as by leakage. Rather, the slight interior positive pressure ensures that any leakage will be from, rather than into the body in order to protect against the corrosive effects of sea water and degredation of the hydraulic systems.

Longitudinal movement of the gear racks 31 and 32 is coordinated through the manifold 6 so that the shoulder arrangement 5 rotates about the pivot shaft 22 and pinion 30. The pivot shaft 22 and pinion 30, being fixed to the plate 18, does not rotate relative to the base 3 and the shoulder arrangement 5 rotates thereabout, FIG. 8.

Figure 32:
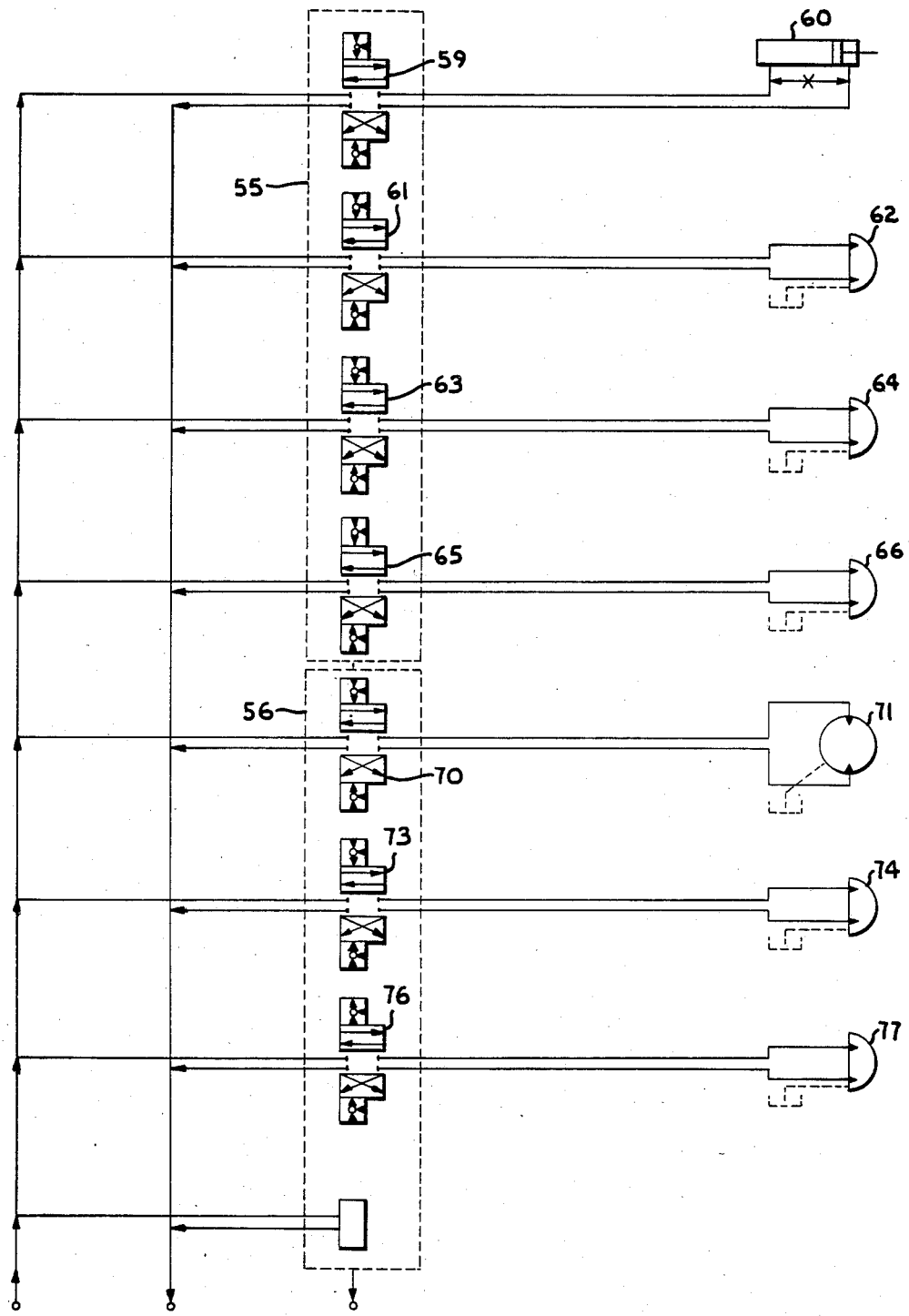
FIG. 32 is a schematic view of a hydraulic manifold with internal pressure and return lines.

The hydraulic power manifold 6 is affixed to the flange 28 and contains a plurality of hydraulic passages running to the azimuth control means and actuator 7, elbow control means and actuator 8, upper arm control means and actuator 9 and the remaining actuators, described below. In the illustrated example, the hydraulic power manifold 6 is in the form of a block of solid material, such as aluminum, which has been bored with passages in precise relationships and connections to comprise a complex manifold. The manifold 6 thereby provides both a structural and an operational function in that it forms a part of the shoulder arrangement 5 to which are connected the azimuth, elbow and upper arm control means and actuators 7, 8 and 9 and directs fluid through its internal passages to the various actuators and fluid dependant parts of the device 1. The manifold 6, FIGS. 5, 7 and 9, includes a forward end 47, rear end 48 and opposite sides 49 and 50. A plurality of servo controlled valves, shown diagrametrically in FIG. 32, are mounted to the opposite sides 49 and 50 and protected by valve covers 51 and 52. Fasteners 53 connect the valve covers 51 and 52 to the margins of the respective manifold sides 49 and 50 for removal and easy access to the servos and valves.

The manifold block 6 is generally divided into two separate manifolds or sets of passageways, one set 55, FIG. 32, generally controlling movement of the shoulder and arm and the second set 56 generally controlling movement of the wrist assembly 13 and the gripper assembly 14. The first set of passages 55 includes a plurality of servo operated valves mounted under one of the valve covers 51 or 52 and the second set of passages 56 similarly includes a plurality of servos and valves mounted under the other valve cover 51 or 52. In the illustrated example, FIG. 32, the first set of passages 55 includes a servo controlled valve 59 controlling the fluid flow to a ram 60 when mounted in the gripper assembly 14, as described below. A servo controlled valve 61 controls fluid flow to a rotary actuator 62 forming part of the azimuth control means 7, a servo controlled valve 63 directs fluid to a rotary actuator 64 for the elbow control actuator 8, and a servo controlled valve 65 controls fluid flow to a rotary actuator 66 for the upper arm actuator 9. The second set of passages 66 includes a servo controlled valve 70 connected to a hydraulic motor 71 forming part of the gripper assembly 14, a servos controlled valve 73 providing fluid control for a rotary actuator 74 for the wrist assembly 13, and a servo controlled valve 76 providing fluid control for the rotary actuator 77 and also for the wrist assembly 13.

The forward end 47 of the hydraulic power manifold 6 includes main ports 80 and 81 which receive hydraulic fluid under pressure from a main reservoir and pump (not shown) which is ordinarily mounted to the vehicle 2 or otherwise positioned remotely from the device 1. Electrical lines (not shown) extend into the hydraulic manifold 6 through an entrance port 83 and into a central chamber (not shown) and then to the servo controlled valves 59, 61, 63, 65, 70, 73 and 76 variously positioned under the valve covers 51 and 52 for subsequent connection to the appropriate hydraulic passages within the manifold 6. The fasteners 53 permit easy removal of the valve covers 51 and 52 for maintenance on the servos and valves.

In the illustrated example, the upper arm member 10 is connected directly to the manifold 6 and extends oppositely of the shoulder arrangement 5. Connection is accomplished by a yoke arrangement consisting of spaced cheek blocks 87 and 88, FIG. 9, which are secured to the manifold 6 at respective flange portions 89. An upper end 93, FIGS. 4 and 9, of the arm member 10 is mounted between the cheek blocks 87 and 88 and includes spaced yoke members 94 and 95, FIGS. 9 and 10, with a tubular housing 97 extending between them. The tubular housing 97 is hollow and appropriate axles or shafts, described below, extend through the housing 97, the yoke members 94 and 95 and the cheek blocks 87 and 88 for independent actuation by the upper arm control means and actuator 9 and the elbow control means and actuator 8.

Figure 11:
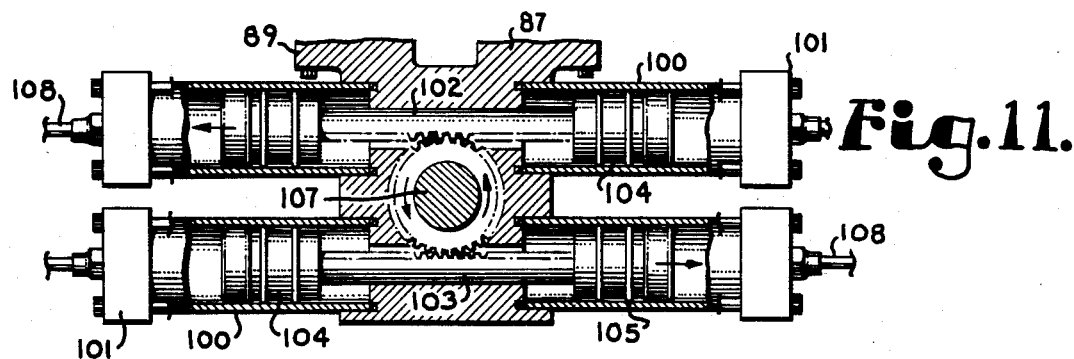
FIG. 11 is a fragmentary sectional view of an actuator of the shoulder arrangement showing one motive position.
Figure 12:
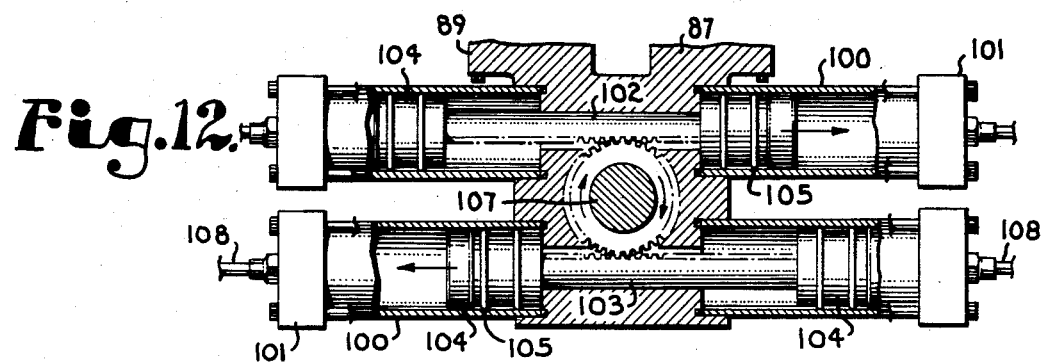
FIG. 12 is a framentary sectional view of the actuator shown in FIG. 11 and showing a second motive position.

Each of the exemplary actuators 8 and 9 are rotary hydraulic actuators using double acting rams with a rack and pinion arrangement. FIGS. 11 and 12 illustrate internal details of the exemplary actuators with each including a housing 99, FIGS. 9 and 10, to which four cylinders 100 are mounted in co-linear and opposing relationship and which have external ends capped by end plates 101. Each of the actuators 8 and 9 contain spaced, parallel toothed racks 102 and 103 and with pistons 104 mounted on opposite ends of the racks 102 and 103. The piston ends of the racks 102 and 103 extend into the aligned cylinders 100 and have appropriate seals 105. A pinion 107 is mounted perpendicularly between each of the spaced racks 102 and 103 and has teeth positively engaging the teeth of the racks. Preferably, the teeth of the pinion 107 and the racks 102 and 103 are finely machined with as little backlash as possible for controlled, steady movement without attendant jerkiness or "dead spots". Moreover, the two racks 102 and 103 for each actuator working in combination to always positively engage the pinion 107 in substantially equal shaft loading to alleviate bearing stress and minimize backlash. As previously related, with respect to the azimuth control actuator 7, the end plates 101 have fluid conduits 108 extending therethrough for directing fluid to the positive side of each of the pistons 104. Further, a static pressure hydraulic line extends into the housing 99 to maintain a slight positive internal pressure for prevention of inward leakage, as referred to above.

Figure 9:
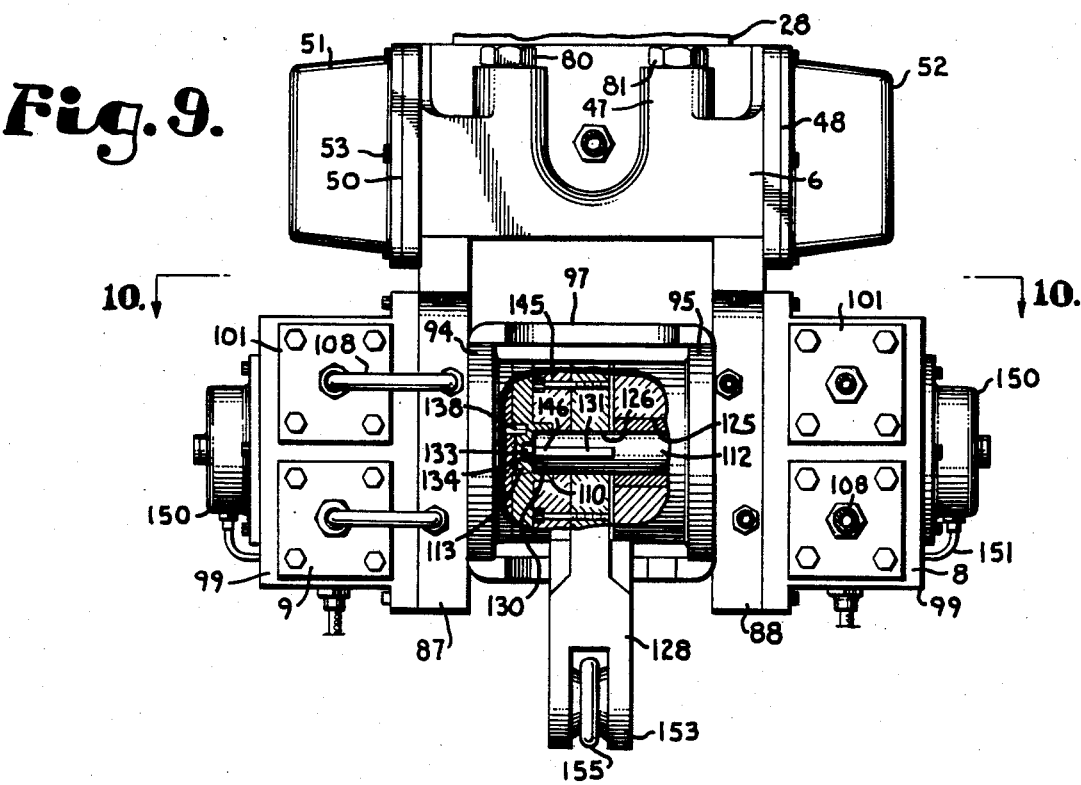
FIG. 9 is a fragmentary end elevational view of the shoulder arrangement.
Figure 10:
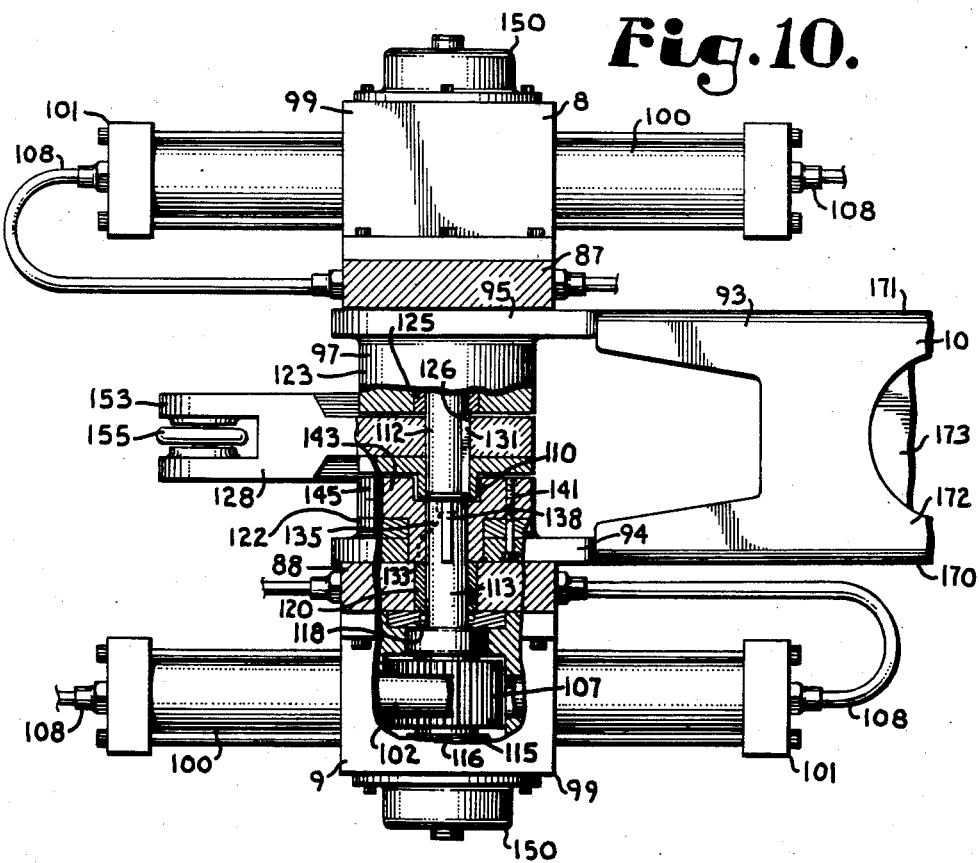
FIG. 10 is a transverse sectional view taken along lines 10—10, FIG. 9.

In the illustrated example, FIGS. 9 and 10, the elbow control actuator 8 is mounted to the cheek block 87 and the upper arm control actuator 9 is mounted to the cheek block 88 and respectively cause movement of the forearm member 11 and the upper arm member 10. Respective and independent movement is accomplished by a split shaft arrangement utilizing a backup recentering means 110 to permit a full range of forearm movement regardless of the rotative position of the upper arm member 10. Respective shafts 112 and 113 respectively extend from the elbow control actuator 8 and the upper arm control actuator 9 and have confronting inner end portions 115 mounted within the actuator housing 99 and suitably supported by bearings 116 and 117. An annular seal 118 extends between the bearing 117 and the appropriate cheek block 87 or 88 and prevents leakage of fluid into or out of the actuator housing 99. The shafts 112 and 113 then extend through respective bushings 120 in the appropriate cheek blocks 87 and 88, through the yoke member 94 and 95 and into the tubular housing 97.

The tubular member 97 is split laterally and substantially medially and consists of a first half 122 and a second half 123 with the recentering means 110 positioned between the first and second halfs 122 and 123.

The shaft 112 extends from the elbow control actuator 8, through an interior bore 125 in the second half 123 of the housing 97 and through a bore 126 in a lever arm 128 extending outwardly and radially of the housing 97. The lever arm 128 is positioned between the first and second halves 122 and 123 of the housing 97 and is more particularly positioned between the second half 123 and recentering means 110. A distal end portion 130 of the shaft 112 includes a key 131 connecting the lever arm 128 to the shaft 112 for simultaneous rotation and so that the lever arm 128 causes movement of the forearm member 11 relative to the upper arm member 10, as set forth below. An axially located pawl 133 extends from the distal end portion 130 and is received within a receptacle 134, FIG. 9, in the distal end 135 of the shaft 113 to maintain coaxial relative rotation of the shafts 112 and 113.

Direct rotation of the housing 97 and accompanying swinging movement of the upper arm member 10 is caused, not by rotation of the shaft 112, but by rotation of the shaft 113. The shaft 113 has a key 138, FIG. 10, mounted adjacent a shaft distal end 135 and which nonrotatably secures the housing first half 122 to the shaft 113 so that as the upper arm actuator 9 causes rotation of the shaft 113, the upper arm member 10 swings therewith.

Figure 13:
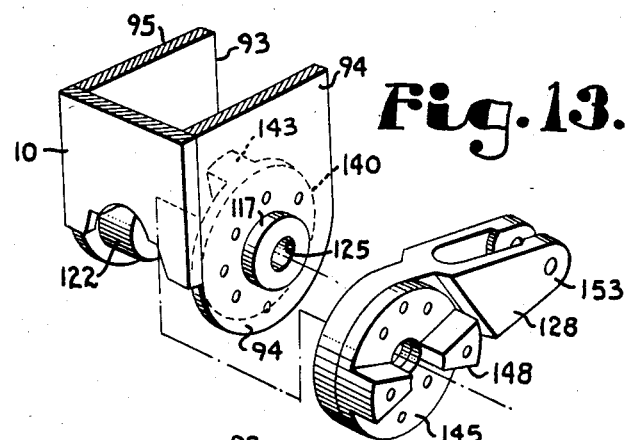
FIG. 13 is an exploded, perspective view showing a detail of the construction of a portion of the shoulder arrangement.
Figure 14:
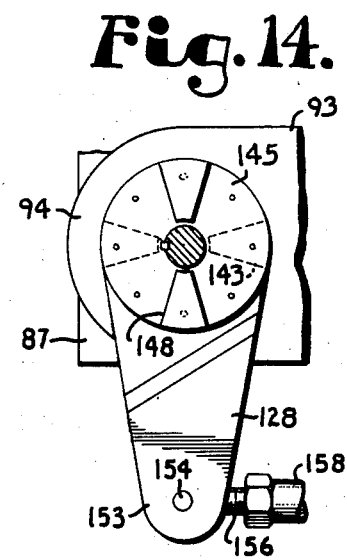
FIG. 14 is a fragmentary view of the detail shown in FIG. 13 and showing an elbow control link in one motive position.
Figure 15:
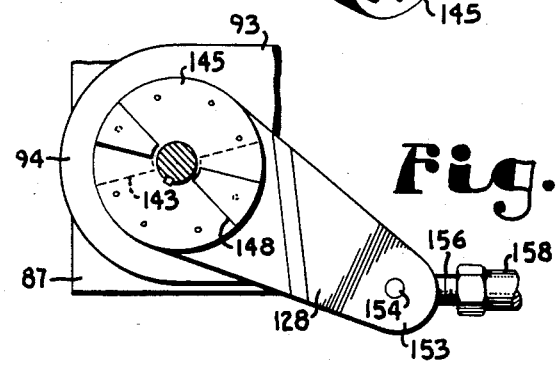
FIG. 15 is a fragmentary view of the detail shown in FIG. 13 and showing the elbow control link of FIG. 14 in a second motive position.

The recentering means 110, FIGS. 13, 14 and 15, includes a first plate 140 secured as by bolts 141, FIG. 10, to the first half 122 of the housing 97. The first plate 140 has opposed, wedge shaped lugs 143 which move with the first plate 140 as it revolves as the upper arm member 10 swings forwardly and rearwardly. The lugs 143 are preferably diametrically opposed and have flat face surfaces for engagement, described below, with coordinating lugs secured to the second half 123 of the tubular housing 97 of the upper arm member 10. The other half of the recentering means 110 includes a complementary second plate 145 secured to the lever arm 128 as by bolts 146, FIG. 9. The second plate 145 has diametrically opposed lugs 148 and mating surfaces for confronting engagement with the lugs 143 of the first plate 140. The lugs 143 of the first plate are aligned with the longitudinal direction of the arm member 10, FIG. 10, and the lugs 148 of the second plate 145 are aligned longitudinally with respect to the longitudinal axis of the lever arm 28, FIGS. 14 and 15. As the lever member 128 moves relative to the upper arm member 10, limits of rotation are mechanically provided by abuttment of the lugs 143 and 148. Approximately 110 degrees of relative rotation from stop to stop is permitted before the lugs contact each other.

The recentering means 110 provides this full 110 degrees of rotation of the lever arm 128 relative to the upper arm member 10 throughout the full travel of the upper arm member 10. This is because the shaft 112 is not joined to the tubular housing 97 but rotates freely and is only nonrotatably connected to the lever arm 128 as previously described. Movement of the upper arm member 10, as caused by rotation of the shaft 113 upon movement of the upper arm control actuator 9, causes the first plate 140 to rotate relative to the second plate 145 throughout the 150 degrees of travel. Upon abutment of the lugs 143 and 148, continued rotation of the first plate 140 also rotates the second plate 145 which causes movement of the lever arm 128, FIG. 15.

As shown in FIGS. 14 and 15, the lugs 143 and 148 are not always in abutment. This lack of mutual engagement of course prevents the lever arm 128 and forearm member 11 from moving relative to the upper arm member 10 throughout a mechanically defined range of travel. Preferably, relative positioning and recentering is not accomplished mechanically but is accomplished hydraulically and controlled electronically. The electronic circuitry is the principal means for finding relative positioning and coordinated movement and the recentering means 110 is provided only as a mechanical backup. Preferably the lugs 143 and 148 do not contact each other and are brought only close to each other by electronic circuitry.

To provide electrical feed back of the relative rotational position of the shafts 112 and 113 and thereby of the upper arm member 9 and forearm member 11, potentiometers 150 are mounted on the outward ends of the respective shafts 112 and 113 and fastened outwardly of the respective actuator housing 99. The potentiometers transmit an electrical impulse sensing the relative rotational position of the shafts 112 and 113 to provide accurate electrical feed back to a controller unit (not shown). The electrical lines extend through a conduit 151, FIG. 9, and are then fed through the manifold 6.

The mounting of the manifold 6, azimuth control means and actuator 7, elbow control means and actuator 9 within the shoulder arrangement 5 reduces extended weight which would otherwise occur by placing such actuators outwardly onto the operating arm. This reduction of extended weight alleviates any necessity for the actuators to lift their own weight and enables the force capability of the actuators to be reserved for lifting only the arms themselves and objects seized in the grippers. Additionally, the grouping of the manifold 6 and the control means and actuators 7, 8 and 9 in the shoulder arrangement 5 provides substantially direct contact between the manifold 6 and the actuator enabling rigid tubing to be used as conduits in the shoulder arrangement 5. This reduces the overall use of flexible hydraulic hose which of course is subject to volumetric change by expansion under internal pressure and induces a spongy control response as well as being subject to deterioration and leakage. Flexible hydraulic conduits or hoses are thereby needed only for the arms. The grouping of the actuators in the shoulder arrangement 5 minimizes the necessity for dynamic seals in the manipulator 1 by having the actuators move with the shoulder arrangement 5, thereby minimizing wear and possibility of leakage.

The lever arm 128 includes a bifurcated end portion 153, FIG. 17, forming a yoke with a pivot pin 154 extending therethrough. An eye bolt 155 is pivotally connected by the pivot pin 154 within the bifurcated end portion 153 and includes a threaded shaft 156, FIG. 19, extending into and adjustably mounted within a linkage rod 158 operably connected to the forearm member 11 at the elbow joint 12. The other end 159 of the linkage rod 158 also includes an eye bolt 160 with a threaded shaft inserted at the other end 159 and adjustable in length for correcting throw or degrees of movement of the forearm member 11.

The upper arm member 10 is generally rectangular in cross section with the upper end 93 connected to the shoulder arrangment 5 as set forth above and a lower end 163 forming a yoke with opposed plates 164 and 165. A pivot shaft 167 extends through the plates 164 and 165 at the lower end 163 and is supported in bearings 168 respectively connected to the plates 164 and 165. Preferably, the upper arm member 10 has opposite side walls 170 and 171 with front and rear walls 172 and 173 forming the rectangular configuration and tapering toward the lower end 163. In the illustrated embodiment, the walls 170 through 173 have lightening holes 175 to reduce extended weight and for ease of maintenance. All hydraulic lines extending to components attached directly and indirectly to the upper arm member are routed through the upper arm member 10.

Figure 23:
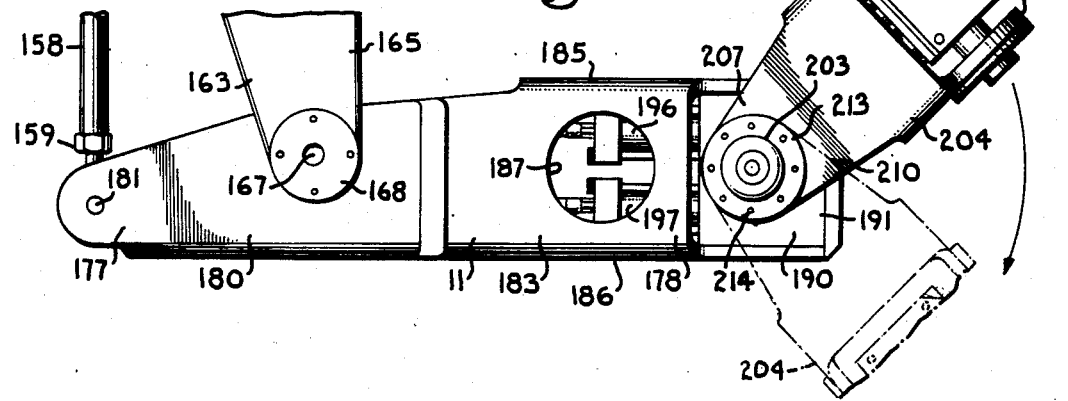
FIG. 23 is a fragmentary side elevational view of the forearm and wrist arrangement showing motive positioning.

The forearm member 11 is connected to the lower end 163 by the pivot shaft 167 at the elbow joint 12 located intermediately of the opposite ends 177 and 178, FIG. 23, so that the portion of the forearm member 11 located between the connection of the shaft 167 and the connection of the linkage rod 158 to the end 177 acts as a lever arm 180.

The end 177 tapers for weight reduction and forms a yoke through which a shaft 181 extends to secure the eyebolt 160 of the linkage rod 158 to the forearm member 11. Thus, push/pull movement of the linkage rod 158 tends to swing the forearm member 11 about the pivot shaft 167 and cause movement of the forearm member 11 in a plane coplanar to the plane of movement of the upper arm member 10.

The linkage rod 158 remains parallel to the upper arm member 10 during use and forms a parallelogram structure. As the upper arm member 10 swings forwardly and rearwardly, the parallelogram arrangement of the linkage rod 158 and the upper arm member 10 tends to make the forearm member 11 remain at the same relative angle to gravity throughout the swinging range of movement of the upper arm member 10 unless control inputs are made to swing the forearm member 11. In the absence of control inputs to the forearm member 11, the angle between the upper arm member 10 and forearm member 11 changes as a direct consequence of swinging of the upper arm member 10 up to the 110 degree limit of relative rotation, at which point the angle between the upper arm member 10 and the forearm member 11 will remain static and the angle of the forearm member 11 will change relative to gravity. This automatic and mechanical maintenance of the position of the forearm member 11 relative to gravity provides ease of use, as a gripped object may be moved forwardly or rearwardly and remain at the same relative height, and contributes to long dynamic seal wear, as the elbow control actuator 8 need not operate.

Figure 21:
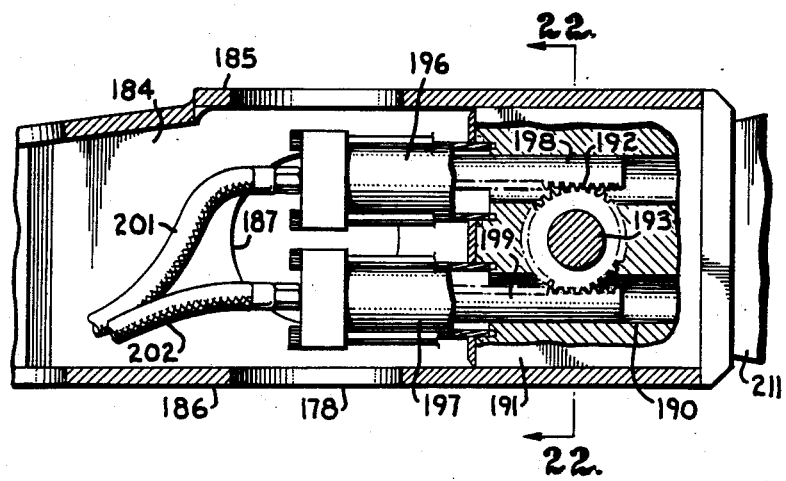
FIG. 21 is an enlarged fragmentary view taken along lines 21—21, FIG. 20.
Figure 22:
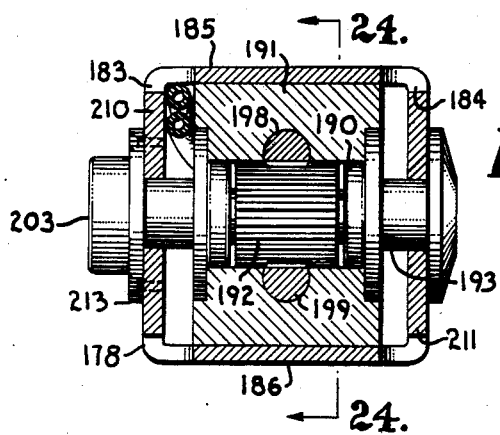
FIG. 22 is a cross-sectional view taken along lines 22, FIG. 21.

Similarly to the configuration of the upper arm member 10, the forearm member 11 is rectangular in cross section, FIG. 22, and includes spaced side walls 183 and 184 and opposite end walls 185 and 186 to form a hollow body through which hydraulic lines are routed. Appropriate lightening holes 187 reduce extended weight and provide access for ease of maintenance. The wrist assemby 13 swings relative to the forearm member 11 and pitch movement of the wrist assembly 13 relative to the forearm member 11, FIG. 23, is caused by a rotary hydraulic actuator or pitch actuator 190 mounted in the end 178 of the forearm member 11, FIGS. 21 and 22. The exemplary pitch actuator 190 is a rotary hydraulic actuator and includes a sealed body 191 encasing a pinion 192 on a shaft 193 extending transversely to the longitudinal axis of the forearm member 11 and suitably mounted in bearings 194, FIG. 22. Spaced cylinders 196 and 197 respectively contain toothed racks 198 and 199 engaging the pinion 192 and through opposing push/push movement of the two racks, cause selective rotation of the pinion 192 and according rotation of the shaft 193. Appropriate hydraulic lines 201 and 202 routed through the forearm member 11, FIG. 21, and connect the cylinders 196 and 197 to the hydraulic power manifold 6. A potentiometer 203 connects to the shaft 193 and projects from the side wall 183 to provide feedback for relative electronic positioning.

The wrist assembly 13 includes a first wrist portion 204 which swings upwardly or downwardly (pitch) of the forearm member 11 and a second wrist portion 205 which swings laterally (yaw) of the first wrist portion 204 and the forearm member 11. The first wrist portion 204 is of generally rectangular cross section, FIG. 25, and has opposite ends arranged to form yokes 207 and 208 situated 90 degrees of rotation from each other. The yoke end 207 is formed by bifurcated arms 210 and 211 straddling the body 191 of the pitch actuator 190.

The arms 210 and 211 are non-rotatably secured, as by keying, to the shaft 193 so that as the shaft 193 rotates, the first wrist portion 204 swings relative to the forearm member 11. The arms 210 and 211 are positioned between respective mounting flanges 213 fixed to opposite ends of the shaft 193 and secured to the respective arms 210 and 211 as by bolts 214. The yoke end 208 of the first wrist portion 204 is disposed in 90 degrees of rotation to the yoke end 207 and also includes spaced arms 216 and 217. The second wrist portion 205 has opposite ends 218 and 219, FIGS. 28, 29 and 30, and the end 218 is connected to the first wrist portion 204 and the end 219 is connected to the gripper assembly 14.

A second wrist portion 205 at the end 218 contains a rotary hydraulic actuator or yaw actuator 221, FIG. 26, which controls yaw of the second wrist portion 205 relative to the first wrist portion 204. The yaw actuator 221 is arranged in back-to-back relationship relative to the pitch hydraulic actuator 190, that is, the cylinders 196 and 197 of the pitch actuator 190 point toward the end 177 of the forearm member 11 whereas the cylinders, described below, of the yaw actuator 221 point toward the end 219 and the gripper assembly 14. This allows a very short first wrist portion 204 to be utilized and provides a coupled length which is significantly anthropomorphic.

Figure 20:
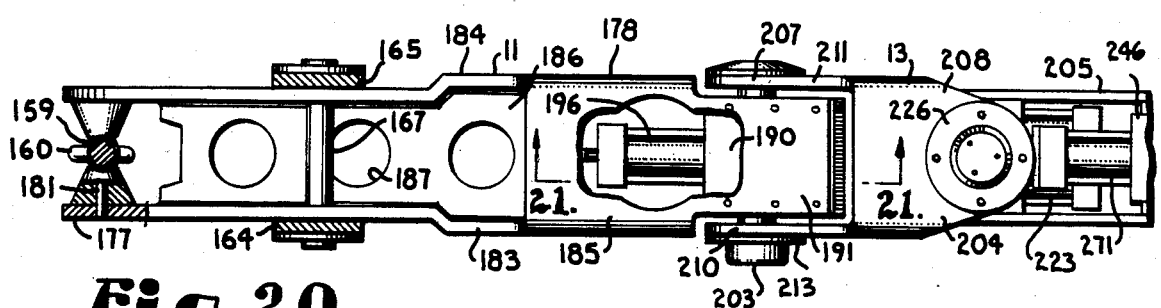
FIG. 20 is a fragmentary, plan view of the forearm and wrist arrangement.

In the illustrated example, the yaw actuator 221 includes a body 222, FIGS. 28, 20 and 30, situated between the arms 216 and 217 of the first wrist portion 204 and with side-by-side cylinders 223 extending from the body 222 and pointing toward the end 219. A shaft 224 extends between the spaced arms 216 and 217 and is held in non-rotatable relationship to the arms 216 and 217 as by a key 225 securing same to respective arm flanges 226, FIG. 26. The shaft 224 is suitably supported by bearings 227 and carries a centrally located pinion 229. Suitable journals 230, FIG. 26, maintain the body 222 centered about the pinion 229 and the shaft 224. The cylinders 223 internally have side-by-side toothed racks 231 and 232 and have bores for movement of the racks 231 and 232 within the cylinders 223. Appropriate lines 233 routed through the upper arm member 10, forearm member 11 and first wrist portion 204 connect the cylinders 223 to the hydraulic power manifold 6 to provide motive power for longitudinal movement of the racks 231 and 232, thereby causing swinging of the second wrist portion 205 about the non-rotatably mounted shaft 224 for yaw movement of the second wrist portion 205 relative to the first wrist portion 204. A potentiometer 235 provides electrical sensing of the rotative position of the shaft 224.

The second wrist portion 205 is formed by spaced side plates 236 and 237 secured at the end 218 by bolts 238, FIG. 30. At the forward end 219, FIGS. 28, 29 and 30, the side plates 236 and 237 are connected to an actuation means for the gripper assembly 14. In the illustrated example, the actuation means include a continuous rotation means 240 and a gripper actuation means 241 which operate in coordination so that the jaws, described below, of the gripper assembly 14 may open and close while rotating. In the illustrated example, the side plates 236 and 237 are connected at the forward end 219 to a mounting block 243 as by bolts (not shown). The mounting block 243 has a central aperture 244, FIG. 30, for a purpose later described.

Figure 31:
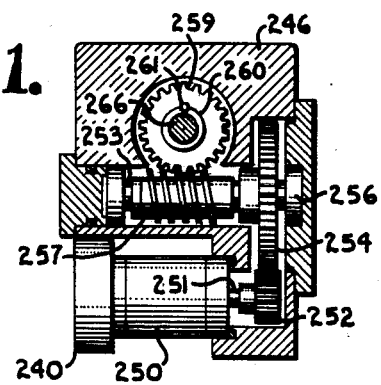
FIG. 31 is a cross-sectional view taken along lines 31—31, FIG. 30.
Figure 4:
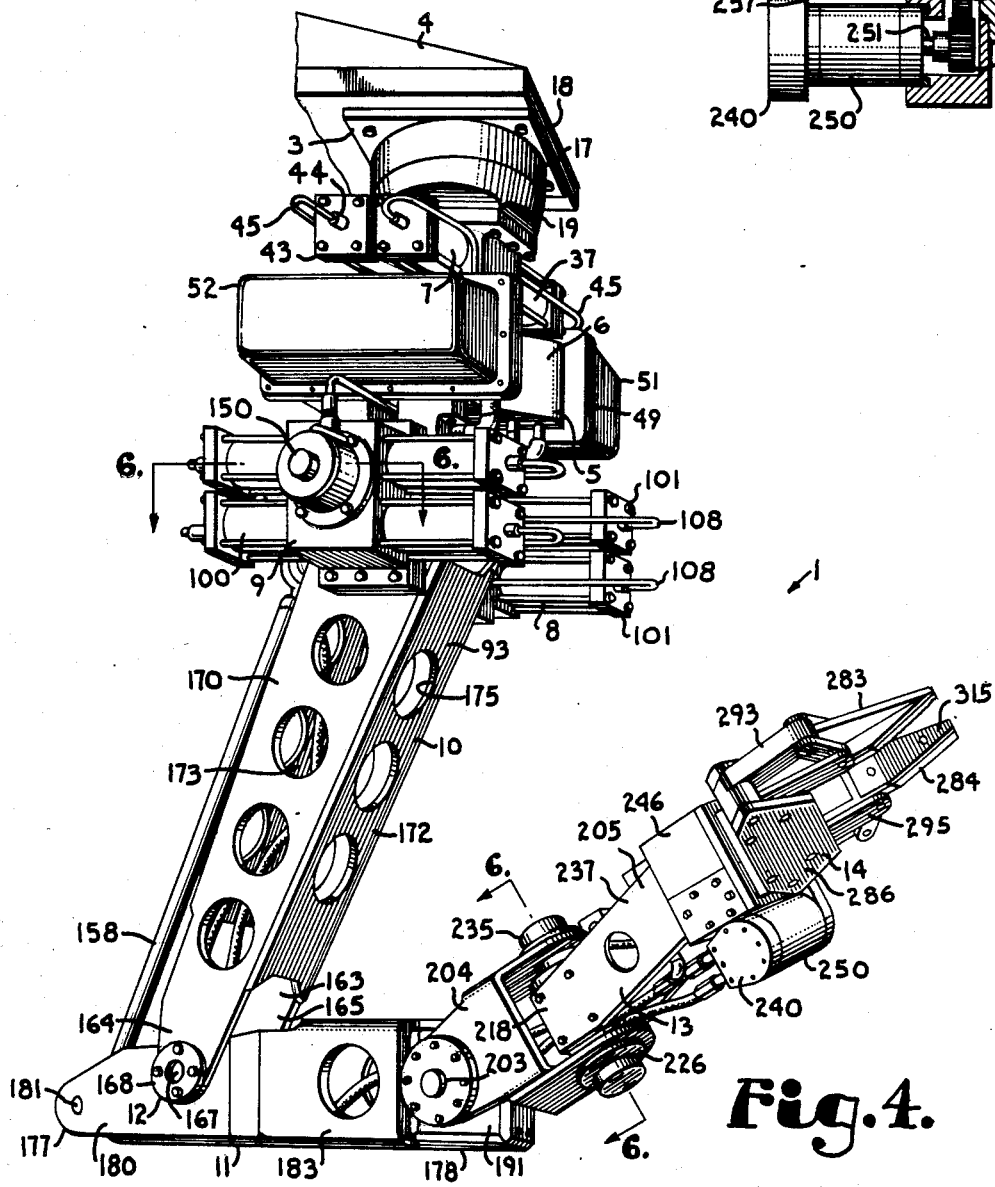
FIG. 4 is an enlarged perspective view of the manipulator device.

A second mounting block 246 is in turn secured to the mounting block 243 and is positioned outward of the termination of the side plates 236 and 237. The mounting block 246 includes a central cavity 247 communicating with a through bore 248. A bidirectional rotary hydraulic motor 250 is preferably mounted to a bottom side of the mounting block 246, FIGS. 30 and 31, for an unobstructed field of view, as by a television camera (not shown) and drives a shaft 251 having a gear 252 mounted to its end. A shaft 253 is disposed upwardly of the shaft 251 and is driven by a gear 254 mounted on its end and engaged with the gear 252. The shaft 253 is mounted in suitable bearings 256 and holds a worm gear 257 which in turn rotates a pinion 259 affixed to a shaft 260 by a key 261 to prevent relative rotation. The pinion 259 is situated in the cavity 247 and the rotatable shaft 260 extends through to the aperture 244, the mounting block 243, the bore 248 and the mounting block 246. The gripper assembly 14 is affixed to an end 262 of the shaft 260. The shaft 260 is rotatably supported in bearings 263 respectively mounted within the mounting block 243 and 246. Thus, operation of the rotary hydraulic motor 250 causes rotation of the shaft 260 and accordingly, continuous or 360 degree rotation of the gripper assembly 14.

The gripper actuation means 241 provides variable grip opening and closing of the jaws of the gripper assembly 14 and in the illustrated example, includes a shaft 266 slidably extending through an interior bore 267 extending the length of the shaft 260. The inner shaft 266 has opposite ends 268 and 269, FIG. 30, and the end 268 forms part of a double acting ram 270 which extends into a power fluid cylinder 271 containing interior chambers 272 and 273 with the chamber 272 blocked by an end cap 274. A piston 275 with a small orifice therethrough is connected to the shaft end 268 and separates the chambers 272 and 273. A hydraulic line 276 extends through the end cap 274 and communicates with the chamber 272 and a second hydraulic line 277 is connected to the mounting block 246 and communicates with the chamber 273 by a pilot line 275. Differential hydraulic pressure acts upon the piston 275 and moves the inner shaft 266 back and forth. The double acting ram 270 is capable of longitudinally moving the shaft 266 through the shaft 260 independently of rotation of the shaft 260.

The small orifice extending through the piston 275 provides a variable actuation force for movement of the shaft 266 and eventual pinching movement of the grippers. The small orifice permits a slight bypass of fluid from one side of the piston 275 to the other through the orifice and thus reduces the engage/disengage characteristic of the grippers. Instead, the orifice permits the operator to detect engagement and then to tighten the grip on the object with an anthropomorphic feel, rather than using maximum and perhaps harmful gripping power on every task. This also contributes to long seal and component life.

The gripper assembly 14 FIGS. 28, 29 and 30, is formed of parallel jaw members 283 and 284 which are connected through a linkage arrangement, described below, between and to spaced, parallel mounting plates 285 and 286 with the linkage being a parallelogram link arrangement for parallel movement of the jaw members 283 and 284. The mounting plates 285 and 286 are generally trapezoidal in shape and have a rear bushing 288 secured therebetween through which the outer and inner shafts 260 and 266 extend. Ways or grooves 289 and 290 are formed on the inner surfaces of the mounting plates 285 and 286 and extend from front to rear of the mounting plates 285 and 286, terminating short of the rear bushing 288.

The parallel link arrangement includes first and second pairs 292 and 293 of upper and lower inner L-shaped links 295 and outer links 296. The jaw members 283 and 284 each have a generally L-shaped leg 298 to which the inner links 295 are pivotally connected at an inner end 300 and the outer links 296 are connected at an outer end 301 of the leg 298. An opposite end 303 of the outer links 296 is pivotally connected to an arm 304 secured to a rear side of the mounting plate 285 and 286. The inner links 295 are generally L-shaped and are pivotally mounted between the mounting plates 285 and 286 at the apex of the L by a pin 307. A leg portion 308 extends toward the longitudinal center line of the mounting plates 285 and 286 and the upper and lower inner links 295 are pivotally interconnected by a bushing 310 mounted therebetween and having outwardly extending pins 311.

In the illustrated example, the outer shaft 260 is secured to the rear bushing 288, by a key (not shown) so that the gripper assembly 14 is fixed to the shaft 260 and rotates therewith. The shaft 260 terminates at the rear bushing 288 and the inner shaft 266 extends outwardly from the bushing 288 from the termination of the shaft 260 and is secured to the bushing 310 by a bolt 313. The side pins 311 extend from the bushing 310 and slidably engage in the ways or grooves 289 and 290. Thus, push/pull movement of the shaft 266 causes movement of the bushing 310 which, being kept centered by the pins 311 in the respective ways or grooves 289 and 290 causes even inward and outward movement of the parallel jaw members 283 and 284. Preferably, the parallel jaw members 283 and 294 are each covered with removable faces 315 which may be knurled or otherwise textured for a gripping engagement. The removable faces 315 are secured to the jaw members 283 and 284 as by bolts 316.

In operation of the gripper assembly 314, the continuous rotation means 240 provides continuous spinning or rotation of the gripper assembly 14 without adversely affecting the ability of the jaw members 283 and 284 to either move apart or move together and grip a device. Commensurately, operation of the gripper actuation means 241, does not adversely effect the continuous rotation means 240, thus enabling the gripper assembly 14 to grasp and simultaneously rotate in either direction for twisting wire bundles and tightening or loosening bolts and nuts and the like.

It is to be understood that while certain forms of the present invention have been illustrated and described herein, it is not to be limited to the specific forms or arrangement of parts described and shown.

What is claimed and desired to be secured by Letter Patent is as follows:

1. A manipulator device comprising:
   (a) a base for connection to a manipulator support and having a base pivot;
   (b) a shoulder arrangement mounted on said base through said base pivot and having an hydraulic power manifold forming a body of said shoulder arrangement, with said shoulder arrangement including an azimuth control means and actuator, an elbow control means and actuator; and an upper arm control means and actuator all mounted to said body and rotatable therewith on said base pivot;
   (c) an upper arm member swingably connected to said shoulder arrangement and operably connected to said upper arm control means and actuator;
   (d) a forearm member swingably connected to said upper arm member at an elbow joint and operably connected to said elbow control means and actuator;
   (e) a wrist assembly and actuators therefor mounted to a distal end of said forearm member;
   (f) a gripper assembly and actuators therefor mounted to a distal end of said wrist assembly;
   (g) a pivot mechanism connecting said upper arm to said shoulder arrangement;
   (h) said pivot mechanism having opposite ends with said upper arm elevation control means and actuator connected to one end and said elbow elevation control means and actuator connected to the other end and respectively and selectively rotating said pivot mechanism;
   (i) said pivot mechanism including a split shaft having coaxial half shafts with one half shaft rotatably connected to said upper arm elevation control means and the other half shaft rotatably connected to said elbow elevation control means; and
   (j) said other half shaft having a lever arm secured thereto and extending outwardly and having said linkage rod pivotally connected thereto for push-pull movement as said other half shaft rotates.

2. The manipulator device as set forth in claim 1 including:
   (a) a recentering mechanism situated between said half shafts and having confronting members respectively connected to said half shafts and having coordinating abutment lugs;
   (b) said one half shaft positioning said confronting members and setting and resetting an extent of rotation of said other half shaft relative to said one half shaft.

3. A hydraulically powered manipulator device comprising:
   (a) a base for connection to a manipulator support and having a base pivot;
   (b) a shoulder arrangement mounted on said base through said base pivot and formed of a body comprising a hydraulic power manifold with control valves and actuators mounted on said manifold, said control valves and actuators including a shoulder azimuth control, elbow control, and upper arm control all mounted to said manifold and rotatable therewith on said base pivot;
   (c) an upper arm member swingably connected to said shoulder arrangement and operably connected to said upper arm control;
   (d) a forearm member swingably connected to said upper arm member at an elbow joint and operably connected to said elbow control;
   (e) a wrist assembly and actuators therefor mounted to a distal end of said forearm member; and
   (f) a gripper assembly and actuators therefor mounted to a distal end of said wrist assembly;
   (g) said forearm member has a distal end including a rotary hydraulic actuator mounted therein and rotating a first shaft about a first axle;
   (h) said wrist arrangement includes a first wrist member and a second wrist member;
   (i) said first wrist member is connected to said shaft and swings about said first axis to provide pitch movement when said shaft rotates; said first wrist member being characterized by the absence of any actuator mounted therein;

(j) said second wrist member has a rotary hydraulic actuator mounted therein and rotating about a second shaft and about a second axis to provide yaw movement, and second shaft being nonrotatably affixed to said first wrist member so that said second wrist member swings thereabout;

(k) said actuator of said forearm member and the actuator of said second wrist member each have a body portion with interior body chambers, a centrally mounted pinion connected to said shaft, two cylinder barrels with opposite closed ends and piston ends and two pistons extending from said respective barrels and driving two gear racks in said barrels;

(l) said closed ends of said barrels in said forearm member actuator point toward said elbow joint and said closed ends of said barrels in said second wrist member actuator point toward said gripper assembly, thereby providing a short coupled wrist assembly.

4. A wrist and forearm assembly for a hydraulically powered manipulator device comprising:

(a) a forearm member having a distal end including a rotary hydraulic actuator mounted therein and rotating a first shaft about a first axis; and (b) a wrist arrangement including a first wrist member and a second wrist member;

(c) said first wrist member being connected to said first shaft and swinging about said first axis when said shaft rotates, said first wrist member being characterized by the absence of any actuator mounted therein;

(d) said second wrist member having a rotary hydraulic actuator mounted therein and rotating about a second shaft and a second axis, said second shaft being nonrotatably affixed to said first wrist member so that said second wrist member swings thereabout;

(e) the actuator of said forearm member and the actuator of said second wrist member each having a body portion with interior body chambers, a centrally mounted pinion to the respective said shaft, two cylinder barrels with opposite closed ends and piston ends and two pistons extending from respective barrels and driving two gear racks in said barrels;

(f) said closed ends of said barrels in said forearm member actuator point in a first direction and said closed ends of said barrels in said second wrist member actuator point in a second direction, thereby providing a short coupled wrist assembly.

5. A manipulator device comprising:

(a) a base for connection to a manipulator support and having a base pivot;

(b) a shoulder arrangement mounted on said base through said base pivot and having a hydraulic power manifold forming a body of said shoulder arrangement, with said shoulder arrangement including an azimuth control means and actuator, an elbow control means and actuator, and an upper arm control means and actuator all mounted to said body and rotatable therewith on said base pivot;

(c) an upper arm member swingably connected to said shoulder arrangement and operably connected to said upper arm control means and actuator;

(d) a forearm member swingably connected to said upper arm member at an elbow joint and operably connected to said elbow control means and actuator;

(e) a wrist assembly and actuator therefor mounted to a distal end of said forearm member;

(f) an end effector mounted to a distal end of said wrist assembly;

(g) a pivot mechanism connecting said upper arm to said shoulder arrangement;

(h) said pivot mechanism having opposite ends with said upper arm elevation control means and actuator connected to one end and said elbow elevation control means and actuator connected to the other end and respectively and selectively rotating said pivot mechanism;

(i) said pivot mechanism including a split shaft having coaxial half shafts with one half shaft rotatably connected to said upper arm elevation control means and the other half shaft rotatably connected to said elbow elevation control means; and (j) said other half shaft having a lever arm secured thereto and extending outwardly and having said linkage rod pivotally connected thereto for push-pull movement as said other half shaft rotates.

6. A hydraulically powered manipulator device comprising:

(a) a base for connection to a manipulator support and having a base pivot;

(b) a shoulder arrangement mounted on said base through said base pivot and formed of a body comprising a hydraulic power manifold with control valves and actuators mounted on said manifold, said control valves and actuators including a shoulder azimuth control, elbow control, and upper arm control all mounted to said manifold and rotatable therewith on said base pivot;

(c) an upper arm member swingably connected to said shoulder arrangement and operably connected to said upper arm control;

(d) a forearm member swingably connected to said upper arm member at an elbow joint and operably connected to said elbow control;

(e) a wrist assembly and actuators therefor mounted to a distal end of said forearm member; and (f) an end effector mounted to a distal end of said wrist assembly;

(g) said forearm member has a distal end including a rotary hydraulic actuator mounted therein and rotating a first shaft about a first axle;

(h) said wrist arrangement includes a first wrist member and a second wrist member;

(i) said first wrist member is connected to said shaft and swings about said first axis to provide pitch movement when said shaft rotates; said first wrist member being characterized by the absence of any actuator mounted therein;

(j) said second wrist member has a rotary hydraulic actuator mounted therein and rotating about a second shaft and about a second axis to provide yaw movement, and second shaft being nonrotatably affixed to said first wrist member so that said second wrist member swings thereabout;

(k) said actuator of said forearm member and the actuator of said second wrist member each have a body portion with interior body chambers, a centrally mounted pinion connected to said shaft, two cylinder barrels with opposite closed ends and piston ends and two pistons extending from said respective barrels and driving two gear racks in said barrels;

(l) said closed ends of said barrels in said forearm member actuator point toward said elbow joint and said closed ends of said barrels in said second wrist member actuator point toward said gripper assembly, thereby providing a short coupled wrist assembly.

* * * * *